S. A. SCHEWCZIK.
HEATING OR COOLING PLATE.
APPLICATION FILED MAY 12, 1909.
1,015,404.
Patented Jan. 23, 1912.
2 SHEETS—SHEET 2.
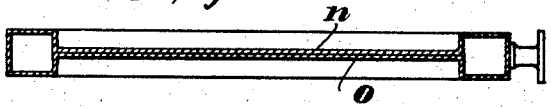
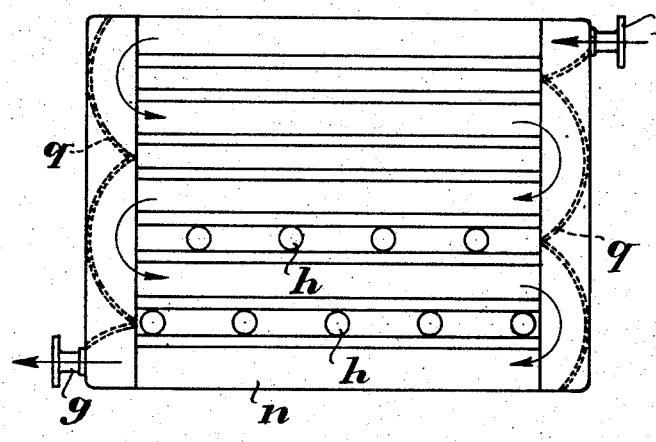
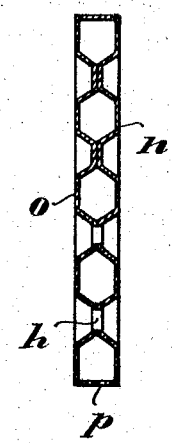
Witnesses
Inventor
Silvio Anton Schewczik,
per
Knight Bro.
Attorneys

UNITED STATES PATENT OFFICE.

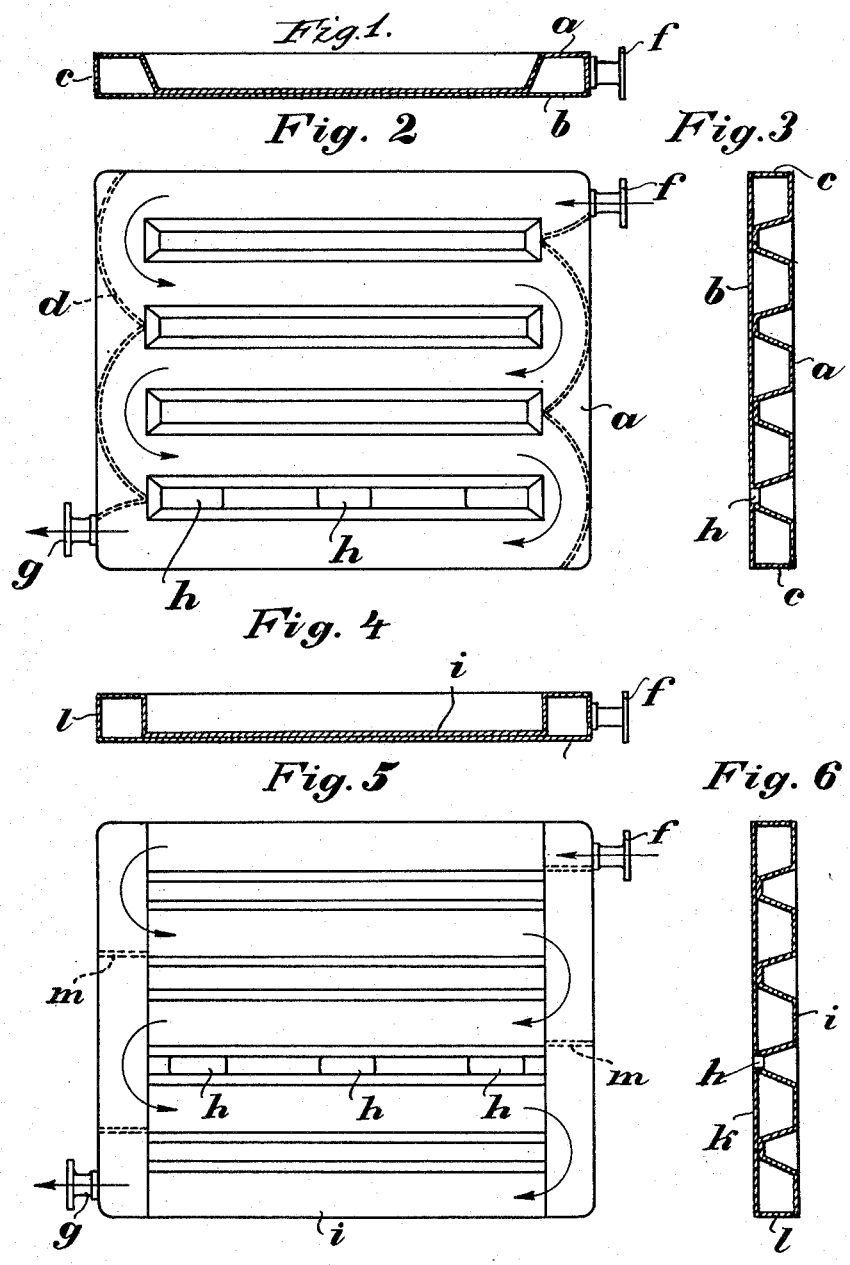

SILVIO ANTON SCHEWCZIK, OF VIENNA, AUSTRIA-HUNGARY.

HEATING OR COOLING PLATE.

1,015,404.  Specification of Letters Patent.  Patented Jan. 23, 1912.

Application filed May 12, 1909. Serial No. 495,414.

*To all whom it may concern:*

Be it known that I, SILVIO ANTON SCHEWCZIK, a subject of the Austro-Hungarian Emperor, residing at Vienna, Austria-Hungary, have invented certain new and useful Improvements in Heating or Cooling Plates, of which the following is a specification.

As is known heating or cooling plates used in conjunction with machines for drying fabrics or other like material have heretofore been constructed by riveting metal plates on both sides of a solid iron frame, with the interposition of solid flat iron or the like rods of equal thicknesses for the guidance of the steam and for reinforcing and connecting the faces of the metal plates. This plate construction presents the disadvantage that owing to the numerous rivets or other connecting means distributed over the entire surface of the plates the latter are very liable to leak, and at the same time greatly increases the weight of the entire device.

The present invention has for its object to obviate these disadvantages while at the same time increasing the conductivity whereby a more rapid and thorough drying of the fabric may be obtained.

The heating or cooling plates in accordance with the invention consist of sheets of metal in which trough-shaped depressions are formed or which are rolled into corrugations and connected at the ends and at the depressions with plain or similarly corrugated plates, strips for the guidance of the steam being inserted in the end connections.

A number of embodiments of the improved heating or cooling plate are illustrated by way of example in the accompanying drawings in which—

Figures 1, 2 and 3 represent a heating or cooling plate which is formed of a sheet of metal with trough-shaped depressions and of a plain sheet of metal with the interposition of an iron frame; the views being a longitudinal section, a top view and a cross section respectively. Figs. 4, 5 and 6 each show a heating or cooling plate formed of a corrugated metal sheet which at the ends and at the depressions is connected with a plain sheet, an iron frame being interposed, the views being a longitudinal section a top view and a cross section respectively. Figs. 7, 8 and 9 illustrate a heating or cooling plate formed of two similarly corrugated plates or sheets connected one with the other with the interposition of a binding or connecting frame, the views being a longitudinal section a top view and a cross section respectively.

The heating or cooling plate (Figs. 1, 2 and 3) is formed of a sheet of metal $a$ in which trough shaped depressions 2 are formed and of a plain flat sheet $b$, between which sheets an iron frame $c$ is interposed, these sheets are connected one with the other where the depressed portions of the plate $a$ contact with the plate $b$. Strips $d$ for the guidance of the steam are provided at the ends of the plate; $f$ is the steam inlet socket and $g$ is the socket for the discharge of the condensation water. If it be desired to provide a circulation of air through the plate adjacent to the channels through which the heating medium passes, openings or perforations $h$ are formed in the depressed portions of the corrugated plate which register with similar openings formed in the plain metal sheet.

The heating or cooling plate illustrated in Figs. 4, 5 and 6 is formed of a corrugated sheet of metal $i$ and a plain sheet $k$ between which an iron frame $l$ is interposed the two sheets of metal are connected one with the other where the depressions in the corrugated plate $i$ contact with the plain plate $k$. In this case also steam guiding strips $m$ are arranged at the ends of the plate; $f$ is the steam admission socket and $g$ the socket for the discharge of the condensation water. If it be desired to provide a circulation of air through the plate, it may likewise be formed with perforations $h$ for that purpose in this case.

The heating or cooling plate illustrated in Figs. 7, 8 and 9 is formed of two similarly corrugated sheets of metal $n$ and $o$ between which an iron frame $p$ is interposed; these sheets of metal are connected one with the other at the depressions. Strips $q$ for the guidance of the steam are arranged at the ends of the plate; $f$ is the steam admission socket and $g$ the socket for the discharge of the water of condensation and $h$ are the perforations which may, if desired be formed in the depressions of the plate.

Having now particularly described and ascertained the nature of my said invention and in what manner the same is to be performed I declare that what I claim is:

1. In a device of the class described, the combination with a frame, plates secured to each side of said frame forming a closed chamber, one of said plates having transverse depending corrugations, a separating plate on each side of said corrugations, the opposite plates contacting with the opposite ends of alternate corrugations, and steam inlet and outlet ports being provided at opposite ends and on opposite sides of the chamber.

2. In a device of the class described, the combination with a frame, plates secured to each side of said frame forming a closed chamber, one of said plates having transverse depending corrugations, a separating plate on each side of said corrugations, the opposite plates contacting with the opposite ends of alternate corrugations, longitudinal openings at points in which two side plates contact, and steam inlet and outlet ports arranged at opposite ends and on opposite sides of the chamber.

SILVIO ANTON SCHEWCZIK.

Witnesses:
August Fugger,
Robert W. Heingartner.